(12) United States Patent
Arimilli et al.

(10) Patent No.: US 6,338,116 B1
(45) Date of Patent: Jan. 8, 2002

(54) METHOD AND APPARATUS FOR A DATA-LESS WRITE OPERATION WITHIN A CACHE MEMORY HIERARCHY FOR A DATA PROCESSING SYSTEM

(75) Inventors: Ravi Kumar Arimilli; Lakshminarayana Baba Arimilli; James Stephen Fields, Jr.; Sanjeev Ghai, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,043

(22) Filed: Nov. 9, 1999

(51) Int. Cl.[7] ................................................. G06F 12/08
(52) U.S. Cl. .................. 711/120; 711/122; 711/143; 711/144; 711/145; 711/146
(58) Field of Search ............................... 711/120, 121, 711/122, 143, 144, 145, 146

(56) References Cited

U.S. PATENT DOCUMENTS 5,568,633 A * 10/1996 Boudou et al. ............. 711/141
6,175,899 B1 * 1/2001 Baylor et al. ............... 711/144

* cited by examiner

Primary Examiner—Hiep T. Nguyen
(74) Attorney, Agent, or Firm—Casimer K. Salys; Bracewell & Patterson, L.L.P.

(57) ABSTRACT

A method and apparatus for casing out data within a cache memory hierarchy for a data processing system is disclosed. The data processing system has multiple processing units, each of the processing units having a multi-level cache memory hierarchy. The cache memory hierarchy includes a first cache and a second cache at a same cache level. Furthermore, the first cache and the second cache share a lower-level cache. In response to a castout write request from the first cache to the lower-level cache, the second cache aborts the data transfer for the castout write request if the second cache already has a copy of data of the castout write request. The coherency state of both the first and second caches are then updated.

6 Claims, 3 Drawing Sheets

METHOD AND APPARATUS FOR A DATA-LESS WRITE OPERATION WITHIN A CACHE MEMORY HIERARCHY FOR A DATA PROCESSING SYSTEM

CROSS-REFERENCE TO A RELATED PATENT APPLICATION

The present invention is related to the subject matter of a co-pending United States Patent Application entitled "MULTIPROCESSOR SYSTEM BUS WITH A DATA-LESS CASTOUT MECHANISM," filed on even date, Ser. No. 09/437,044.

BACKGROUND OF THE INVENTION

1. Technical Field

The present invention relates to cache memories in general and, in particular, to a method and apparatus for sharing data among cache memories within a data processing system. Still more particularly, the present invention relates to a method and apparatus for casting out data within a cache memory hierarchy for a multiprocessor data processing system.

2. Description of the Prior Art

In a symmetric multiprocessor (SMP) data processing system, all of the processing units are generally identical; that is, they all utilize a common set or subset of instructions and protocols to operate and, generally, have the same architecture. Each processing unit includes a processor core having multiple registers and execution units for carrying out program instructions. Each processing unit may also have a multi-level cache memory hierarchy.

A multi-level cache memory hierarchy is a cache memory system consisting of several levels of cache memories, each level having a different size and speed. Typically, the first level cache memory, commonly known as the level one (L1) cache, has the fastest access time and the highest cost per bit. The remaining levels of cache memories, such as level two (L2) caches, level three (L3) caches, etc., have a relatively slower access time, but also a relatively lower cost per bit. Typically, each lower cache memory level has a progressively slower access time and a lower per-bit cost.

Because there are many possible operating scenarios in which data can be transferred between cache memory hierarchies, and between cache levels within a cache memory hierarchy in a multiprocessor data processing system, it is important to efficiently transfer data from one cache to another. The present disclosure is related to a method and apparatus for casting out data within a cache memory hierarchy of a multiprocessor data processing system. Data may be casted out from one cache to another cache, typically a lower level cache, for data deallocation or other reasons.

SUMMARY OF THE INVENTION

In accordance with a preferred embodiment of the present invention, a data processing system has multiple processing units, each of the processing units having a multi-level cache memory hierarchy. The cache memory hierarchy includes a first cache and a second cache at a same cache level. Furthermore, the first cache and the second cache share a lower-level cache. In response to a castout write request from the first cache to the lower-level cache, the second cache aborts the data transfer for the castout write request if the second cache already has a copy of data of the castout write request. The coherency state of both the first and second caches are then updated.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any data processing system having a multi-level cache memory hierarchy. Also, it is understood that the features of the present invention may be applicable in various multiprocessor data processing systems, each processor having a multi-level cache memory hierarchy.

Figure 1:
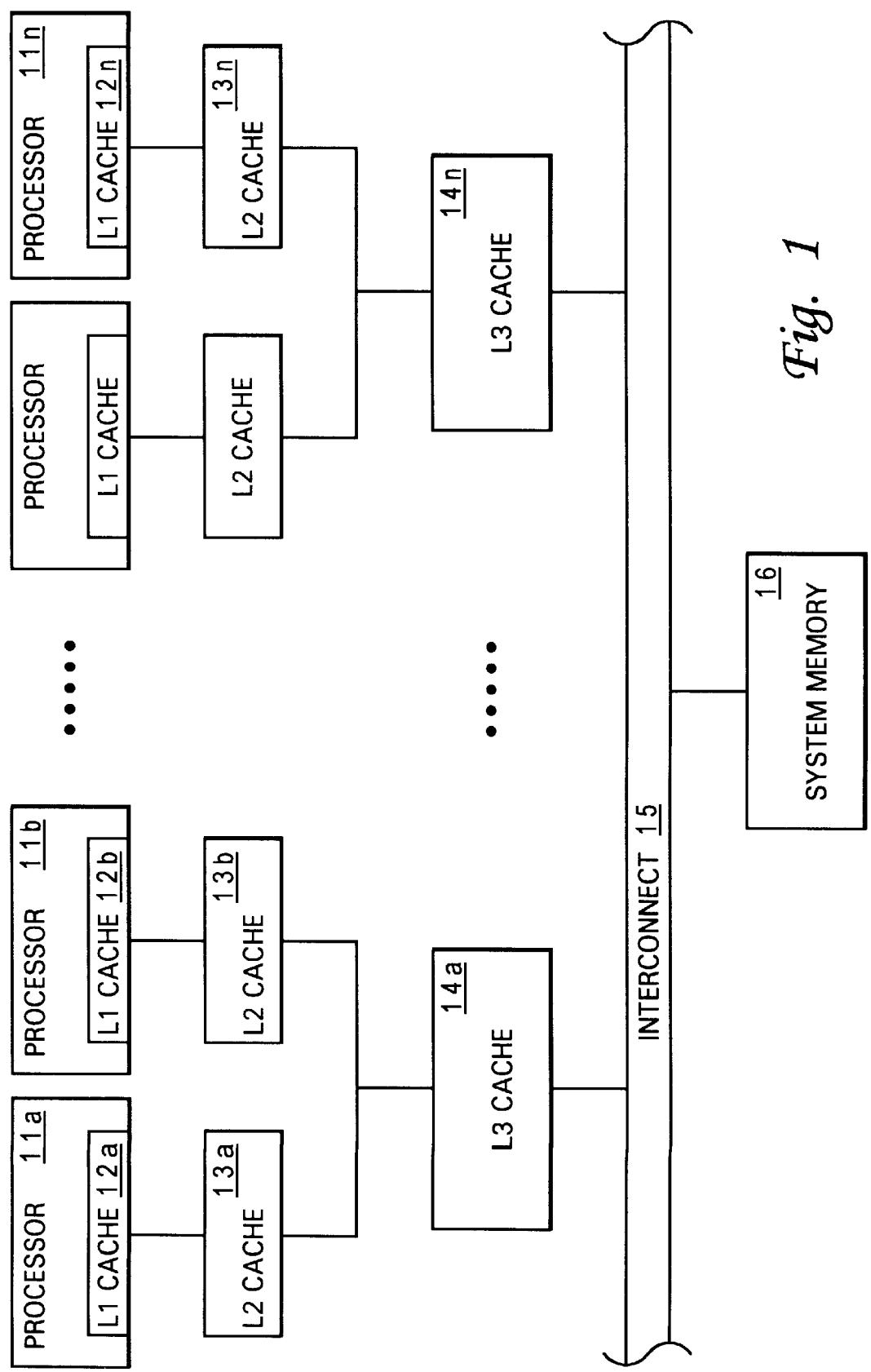
FIG. 1 is a block diagram of a data processing system in which a preferred embodiment of the present invention is incorporated.

Referring now to the drawings and, in particular, to FIG. 1, there is depicted a block diagram of a data processing system in which a preferred embodiment of the present invention is incorporated. As shown, a data processing system 10 includes multiple processors 11a–11n, and each of processors 11a–11n contains a level one (L1) cache. For example, processor 11a contains an L1 cache 12a, and processor 11b contains an L1 cache 12b. Also, each of processors 11a–11n is coupled to a level two (L2) cache. For example, processor 11a is coupled to an L2 cache 13a, and processor 11b is coupled to an L2 cache 13b. In this implementation, two L2 caches are jointly coupled to a level three (L3) cache. For example, L2 caches 13a and 13b are both coupled to an L3 cache 14a.

Processors 11a–11n and their respective cache memory hierarchy are interconnected to each other via an interconnect 15. Interconnect 15 can be implemented as either a bus or a switch. A system memory 16 is also connected to interconnect 15. Although a preferred embodiment of a data processing system is described in FIG. 1, it should be understood that the present invention can be practiced within a variety of system configurations. For example, more than three levels of cache memories can be provided within each cache memory hierarchy.

Figure 2:
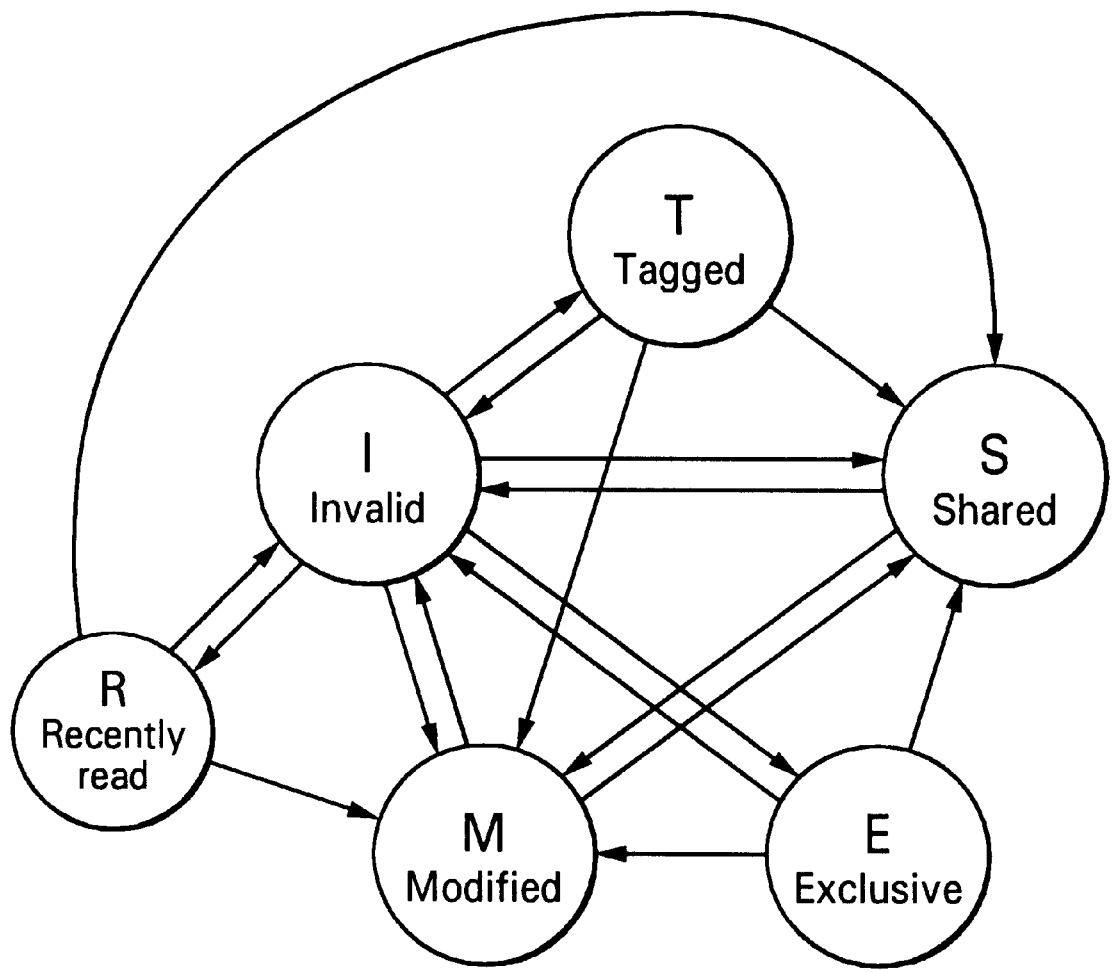
FIG. 2 is a state diagram of a RT-MESI cache coherency protocol for the data processing system from FIG. 1, in accordance with a preferred embodiment of the present invention.

With reference now to FIG. 2, there is depicted a state diagram of a RT-MESI cache coherency protocol for data processing system 10, in accordance with a preferred embodiment of the present invention. This RT-MESI protocol is similar to the prior art MESI protocol in that it includes the same Modified, Exclusive, Shared, and Invalid states, as they are understood by those skilled in the art. But the RT-MESI protocol also includes two new states, namely, a Tagged state (T state) and an Recently-Read state (R state).

The Tagged state provides an indication that a cache block has been modified by a processor but has not yet been written back to a system memory, such as system memory 16 from FIG. 1. For example, when a cache block is in a Modified state in a first processor and a READ operation is requested by a second processor, then the first processor will send a modified intervention response and will source the requested cache block. An intervention is the transfer of data from one processor to another processor on a system bus within a multiprocessor system without going through a system memory. The second processor can thereafter hold the cache block in the Tagged state (while the first processor switches from a Modified state to a Shared state). This operation can be repeated with additional processors such that the cache that has most recently read a copy of the modified cache block will be in the Tagged state while all other processors having copies of the modified cache block will be in the Shared state. In this manner, one cache is "tagged" to indicate that it is currently responsible for writing the modified cache block to the memory hierarchy some time in the future, if necessary, either by sourcing the modified cache block to another cache by modified intervention or by writing back to the system memory.

As shown in FIG. 2, a cache line can switch from an Invalid state to a Tagged state, from a Tagged state to an Invalid state, from a Tagged state to a Modified state, and from a Tagged state to a Shared state. This embodiment of the RT-MESI protocol may further be understood with reference to Table I that illustrates the cache coherency states for a particular cache block in three different processors, $P_0$, $P_1$, and $P_2$:

TABLE I

|  | $P_0$ | $P_1$ | $P_2$ |
| --- | --- | --- | --- |
| Initial States | I | I | I |
| $P_0$ RWITM | M | I | I |
| $P_1$ Read | S | T | I |
| $P_2$ Read | S | S | T |
| Snoop Push ($P_1$ DClaim) | S | S | I |
| $P_1$ DClaim (after retry) | I | M | I |

In the first row of Table I, all three processors start off with the cache blocks in Invalid states. In the second row, processor $P_0$ executes a read-with-intent-to-modify operation (RWITM), and so its cache line switches from an Invalid state to a Modified state. Thereafter, processor $P_1$ requests a read of the cache line; processor $P_0$ intervenes, switches to the Shared state, and processor $P_1$ switches from the Invalid state to the Tagged state (the third row of Table I). Later, processor $P_2$ requests a read of the cache line; processor $P_1$ intervenes, switches to the Shared state, and processor $P_2$ switches from the Invalid state to the Tagged state (the fourth row of Table I).

Since the data is held in a Shared state in one or more other processors, the Tagged state has qualities of both the Shared state and the Modified state, because the data has been modified and not yet written back to the system memory. Indeed, from a processor's perspective, the Tagged state is equivalent to the Shared state, but from a system bus' perspective, a cache line with a Tagged state is essentially treated like a cache line in a Modified state.

The Recently-Read state provides an indication of the most recently acquired Shared cache block that would otherwise be in a Shared state. In other words, when each of two or more cache blocks hold valid a copy of data, all of the cache blocks are in the Shared state except for the cache block that has been recently accessed. That most recently accessed cache block is in a Recently-Read state.

Since the data is held in a Shared state in one or more other processors, the Recently-Read state has qualities of both the Shared state and the Modified state, because the data has been modified and not yet written back to the system memory. From a system bus' perspective, the Recently-Read state is equivalent to the Shared state, but from a processor's perspective, a cache block with a Tagged state is essentially treated like a cache block in a Modified state. As shown in FIG. 2, a cache line can switch from an Invalid state to a Recently-Read state, from a Recently-Read state to an Invalid state, from a Recently-Read state to a Modified state, and from a Recently-Read state to a Shared state.

As a preferred embodiment of the present invention, when a cache attempts to perform a castout write via, for example, a deallocation procedure to a next lower-level cache, the castout write is aborted by a peer cache (at the same horizontal cache level) with no data transfer if the peer cache already has a copy of the data of the castout write. Although the castout write is preferably aborted by a peer cache at the same horizontal cache level as the cache intending to perform the castout, the castout write can be aborted by a third-party cache located at a higher or lower cache level. Particularly in the case of a castout from a Tagged state, the castout data may be directly send to a system memory, and the castout may be aborted by a third party cache located at a higher or lower cache level. The present invention is not necessarily limited to a castout from a higher-level cache directly to a lower-level cache. The lower-level cache is not required to be shared by multiple higher-level caches, as long as the castout write operation is visible to some third party caches.

Figure 3:
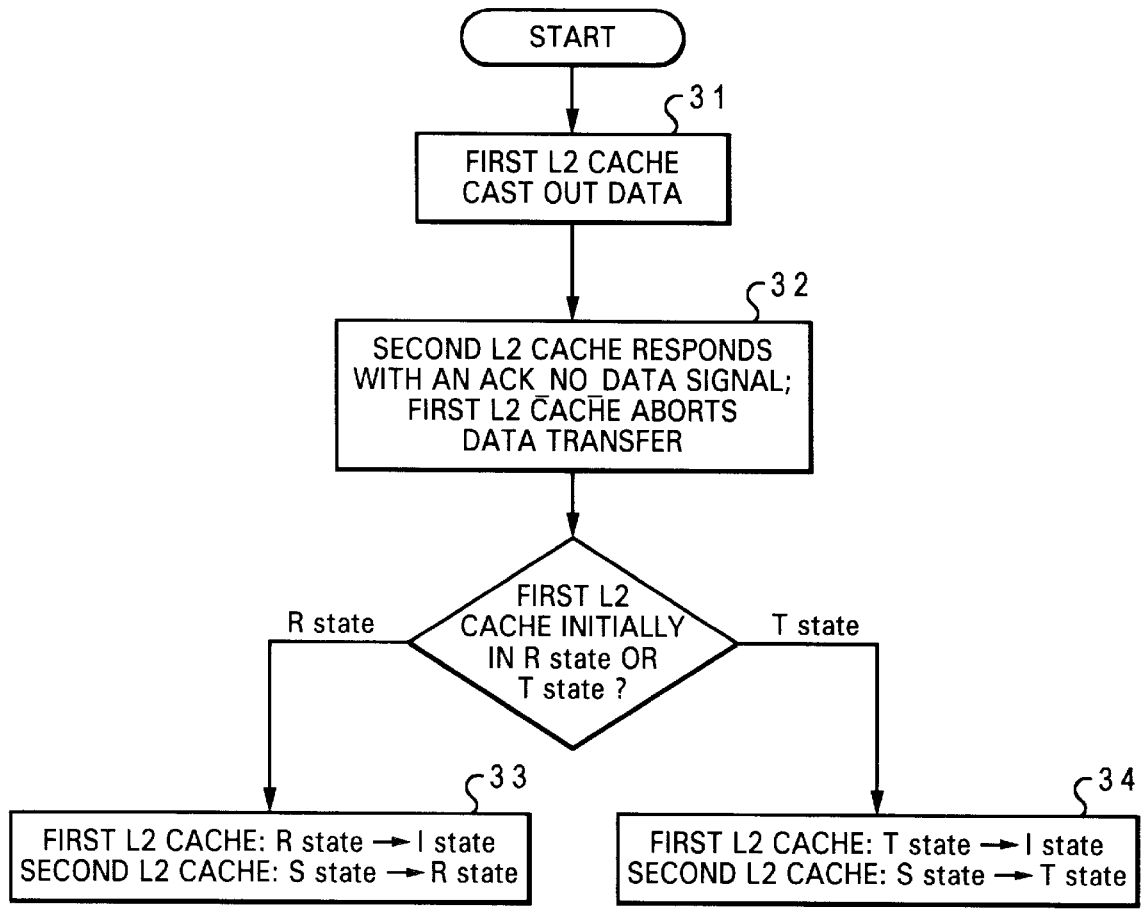
FIG. 3 is a high-level logic flow diagram of a method for casting out data within a cache memory hierarchy for the data processing system from FIG. 1, in accordance with a preferred embodiment of the present invention.

Referring now to FIG. 3, there is illustrated a high-level logic flow diagram of a method for casting out data within a cache memory hierarchy for the data processing system from FIG. 1, in accordance with a preferred embodiment of the present invention. Initially, a first L2 cache, such as L2 cache 13a in FIG. 1, may be in a Tagged state or a Recently-Read state, and a second L2 cache at the same horizontal cache level, such as L2 cache 13b, is in a Shared state. Both first and second L2 caches are connected to a lower-level cache, such as L3 cache 14a in FIG. 1. The L3 cache may be in any state.

At some point, the first L2 cache deallocates, for example, and attempts to perform a castout write to move its castout cache block to the L3 cache, as shown in block 31. By the virtue of its Shared state, the second L2 cache "knows" that it has an identical copy of the cache block the first L2 cache is intending to castout, and the second L2 cache would like to "upgrade" its state from the Shared state to a Tagged state. In order to accomplish such, the second L2 cache sends an Ack_No_Data signal to the first L2 cache to abort the castout write operation, as depicted in block 32.

At this point, if the first L2 cache was initially in the Recently-Read state, the first L2 cache transitions from the Recently-Read state to an Invalid state while the second L2 cache transitions from the Shared state to the Recently-Read state, as shown in block 33. Otherwise, if the first L2 cache was initially in the Tagged state, the first L2 cache transitions from the Tagged state to the Invalid state while the second L2 cache transitions from the Shared state to the Tagged state, as shown in block 34.

As has been described, the present invention provides a method for casting out data within a cache memory hierarchy for a data processing system. The present invention keeps a modified (i.e., Recently-Read or Tagged) cache block active in higher-level caches, and thus improves the chances of finding a fast shared intervention source on subsequent reads. The concept of the present invention can be extended to any number of peer caches sharing a common bus with a single shared next lower-level cache, as long as the responses are implemented in such a way that one Shared state in one of the peer caches can be uniquely selected to accept modified cache block that is in either a Recently-Read state or a Tagged state. The present invention also reduces the castout data bandwidth requirements for Modified/Shared cache blocks such that the speed for subsequent stores to these cache blocks can be improved.

While the invention has been particularly shown and described with reference to a preferred embodiment, it will be understood by those skilled in the art that various changes in form and detail may be made therein without departing from the spirit and scope of the invention.

What is claimed is:

1. A method for casting out data within a cache memory hierarchy for a data processing system, wherein said cache memory hierarchy includes a first cache and a second cache at a same cache level, wherein said first cache and said second cache share a lower-level memory in said cache memory hierarchy, said method comprising:

in response to a castout write request from said first cache to said lower-level memory, aborting data transfer for said castout write request by said second cache if said second cache already has a copy of data of said castout write request; and updating a coherency state of said first and second caches.

2. The method according to claim 1, wherein said updating further includes updating said coherency state of said second cache to a recently-read state, and said coherency state of said first cache to an invalid state if said coherency state of said first cache was in a recently-read state before said castout write request.

3. The method according to claim 1, wherein said updating further includes updating said coherency state of said second cache to a tagged state, and said coherency state of said first cache to an invalid state if said coherency state of said first cache was in a tagged state before said castout write request.

4. An apparatus for casting out data within a cache memory hierarchy for a data processing system, wherein said cache memory hierarchy includes a first cache and a second cache at a same cache level, wherein said first cache and said second cache share a lower-level memory in said cache memory hierarchy, said apparatus comprising:

means for aborting data transfer for a castout write request from said first cache to said lower-level memory by said second cache if said second cache already has a copy of data of said castout write request, in response to said castout write request from said first cache to said lower-level memory; and means for updating a coherency state of said first and second caches.

5. The apparatus according to claim 4, wherein said means for updating further includes a means for updating said coherency state of said second cache to a recently-read state, and said coherency state of said first cache to an invalid state if said coherency state of said first cache was in a recently-read state before said castout write request.

6. The apparatus according to claim 4, wherein said means for updating further includes a means for updating said coherency state of said second cache to a tagged state, and said coherency state of said first cache to an invalid state if said coherency state of said first cache was in a tagged state before said castout write request.

* * * * *